F. M. PRETTYMAN.
MOTOR TRUCK.
APPLICATION FILED APR. 22, 1913.

1,083,135.

Patented Dec. 30, 1913.
2 SHEETS—SHEET 1.

Witnesses:
Christ Feinle, Jr.
P. M. Smith.

Inventor,
F. M. Prettyman.
By Victor J. Evans,
Attorney.

F. M. PRETTYMAN.
MOTOR TRUCK.
APPLICATION FILED APR. 22, 1913.
1,083,135.
Patented Dec. 30, 1913.
2 SHEETS—SHEET 2.
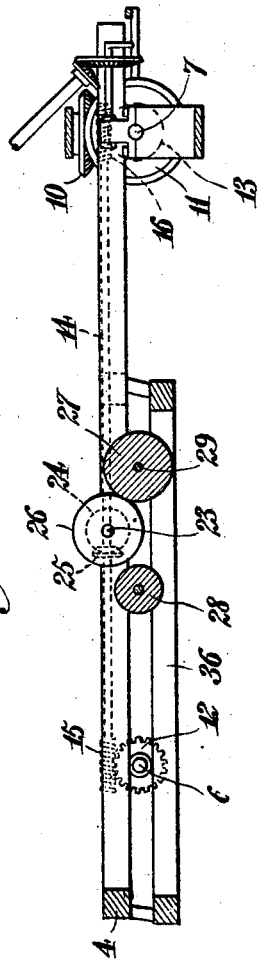
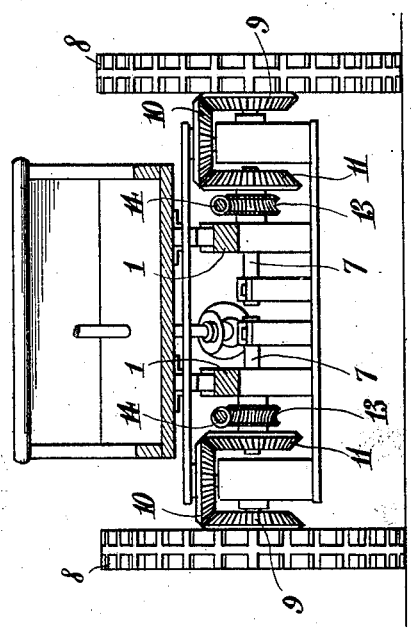
Witnesses:
Christ Feinle, Jr.
P. M. Smith
Inventor,
F. M. Prettyman.
By Victor J. Evans,
Attorney.

UNITED STATES PATENT OFFICE.

FRANCIS M. PRETTYMAN, OF MALLARD, MINNESOTA.

MOTOR-TRUCK.

1,083,135.          Specification of Letters Patent.      Patented Dec. 30, 1913.

Application filed April 22, 1913. Serial No. 762,818.

*To all whom it may concern:*

Be it known that I, FRANCIS M. PRETTYMAN, a native-born citizen of the United States, residing at Mallard, in the county of Clearwater and State of Minnesota, have invented new and useful Improvements in Motor-Trucks, of which the following is a specification.

This invention relates to motor trucks, the object in view being to provide a novel and particularly effective four-wheel transmission gear for motor trucks, which will have the following advantages, namely, the power of the engine may be simultaneously transmitted to all of the wheels of the machine, including both the front steering wheels, and the ordinary rear driving wheels; which will enable the machine to be operated without the employment of the usual brake, the mechanism serving to automatically lock the wheels when the machine is brought to a standstill, thereby preventing the machine from moving forwardly or backwardly, when being operated along a steep hill or incline, whether in a forward or backward direction, and which will greatly simplify and otherwise improve transmission gear of the class described, consequently economizing in the cost of manufacture and maintenance of the truck as a whole.

With the above and other objects in view, the invention consists in the construction, combination and arrangement of parts, as will be hereinafter more fully described, illustrated in the accompanying drawings, and pointed out in the claims hereunto appended.

Figure 1:
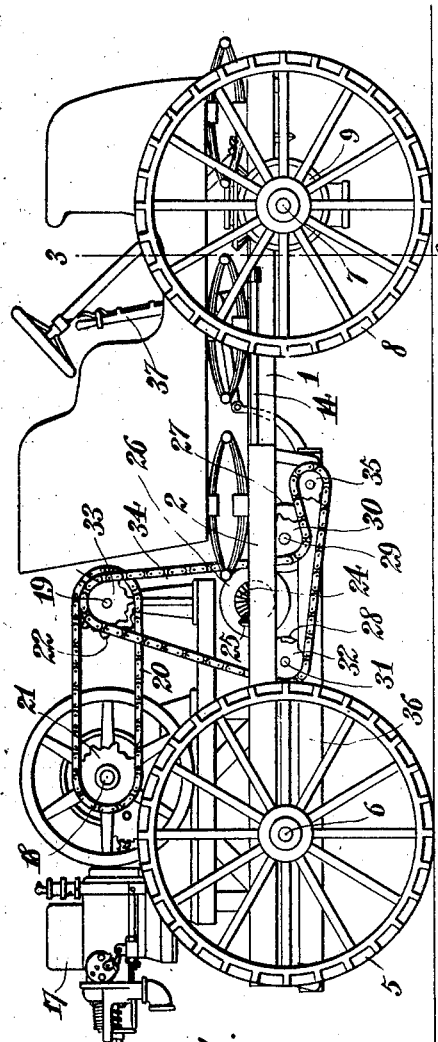
Figure 2:
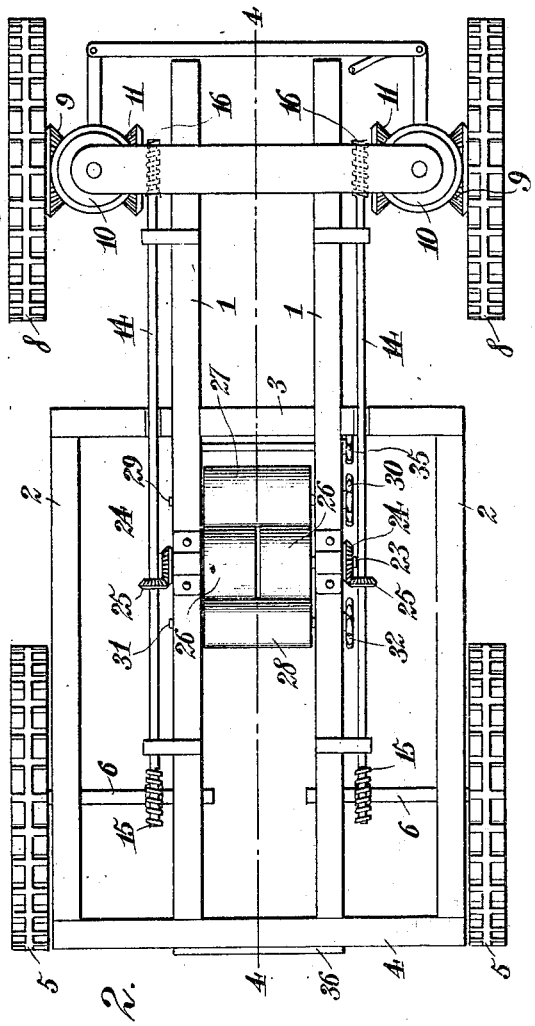

In the drawings: Figure 1 is a side elevation of a motor truck, embodying the present invention. Fig. 2 is a plan view of the same. Fig. 3 is a vertical cross section on the line 3—3 of Fig. 1. Fig. 4 is a vertical longitudinal section on the line 4—4 of Fig. 2.

The truck contemplated in this invention is similar in its general construction and arrangement to that described in my copending application, Serial No. 748,704, filed on or about February 15th, 1913, the truck comprising a frame composed of the main longitudinal side bars 1 spaced at any suitable distance apart and carrying the front and rear axles, as shown.

The rear portion of the frame of the machine has the side bars 2 thereof set at a greater distance apart than the bars 1, all of said bars being, however, in parallel relation to each other, while the bars 2 are connected at their front and rear ends by the front and rear cross bars 3 and 4, respectively, said bars 3 and 4 being also fixedly related to and connected with the parallel main longitudinal bars 1.

The driving wheels 5 are mounted fast on the sections 6 of a centrally divided rear axle, as shown in Fig. 2, each section 6 of the driving axle being adapted to revolve independently of the other, after the manner of the ordinary differential gear now in common use in automobiles. The front axle is likewise divided centrally to comprise two sections 7 which are in line with each other, and which are geared to the steering wheels 8 for the purpose of driving the latter by means of the bevel gear wheels 9, 10 and 11. The knuckles of the steering wheels and the means for supporting the same together, with the means for turning the steering wheels, being fully described in my copending application, it is unnecessary to go into a detailed description of the same herein, the only point that it is necessary to understand being that the steering wheels 8 are driven simultaneously with the rear or usual driving wheels 5 of the machine.

Each of the driving axle sections 6 has fast thereon a worm gear wheel 12, and each of the front axle sections 7 also has a worm gear wheel 13 fast thereon, the teeth of the wheels 13 being pitched reversely to those of the wheels 12, so that when the axle sections 6 revolve in a forward direction for driving the machine ahead, the axle sections 7 revolve in a rearward or reverse direction, thereby causing the wheels 8 to revolve in a forward direction through the medium of the interposed and constantly intermeshing gear wheels 9, 10 and 11.

At opposite sides of the longitudinal center of the machine frame are arranged substantially parallel worm shafts 14, each of which is provided at its opposite extremities with right and left hand worm gears 15 and 16 which mesh, respectively, with the wheels 12 and 13, above referred to.

17 designates a motor mounted at a suitable elevation above and upon the rear end of the frame of the machine, as shown in Fig. 1, the shaft 18 of the motor being geared to a counter shaft 19 arranged in front of the same and parallel thereto, motion being transmitted from the engine shaft to the counter shaft by means of a sprocket chain 20 passing around sprocket wheels 21 and 22 fast, respectively, on the engine shaft and counter shaft. Arranged approximately under the counter shaft 19 is a friction wheel shaft 23 which has fast on its opposite ends miter gear wheels 24 which mesh with other miter gear wheels 25 fast on the worm shafts 14, hereinabove described, the motion of the shaft 23 being thus transmitted to the worm shafts 14 and from the latter to the front and rear wheels 8 and 5. The shaft 23 is divided at or near its center into independently revolving sections, as shown in the plan view Fig. 2, and on the inner end of each of said sections is mounted fast a friction wheel 26, said wheels having wide faces and together forming a transversely elongated divided cylinder. In advance of the wheels 26 is located a friction drive roller 27, the length of which is equal approximately to the combined length of the two wheels 26, a friction drive roller 28 of corresponding length but smaller diameter being located in rear of the wheels 26, as shown in the plan view. The roller 27 is fast on a shaft 29 provided at one end with a sprocket wheel 30. The roller 28 is also mounted fast on a shaft 31 provided at the corresponding end with a sprocket wheel 32.

Fast on the counter shaft 19 is a sprocket wheel 33, around which passes a sprocket chain 34, said chain passing around the sprocket wheel 32 on the shaft 31 and rearwardly around an idler sprocket wheel 35, and thence under and partly around the sprocket wheel 30. By means of the sprocket chain and wheels hereinabove just described, the wheels 30 and 32 are driven in reverse directions, and, therefore, the friction drive rollers 27 and 28 are also driven in reverse directions simultaneously.

In order to shift the driving rollers 27 and 28 alternately into and out of engagement with the friction wheels 26, for the purpose of driving the latter forwardly or rearwardly, the shafts 29 and 31 are mounted in a transmission frame 36 which is connected with the main frame of the machine, as shown, so as to be capable of being shifted back and forth by means of a manually controlled lever 37. When the roller 27 is shifted into frictional engagement with the wheels 26, the machine is driven in a forward direction at a speed commensurate with the diameter of said roller 27 in relation to the wheels 26, and when the roller 28 is shifted into frictional engagement with the wheels 26, the roller 27 being simultaneously shifted out of engagement, the direction of movement of the machine is reversed and the machine driven at a lower rate of speed, due to the relative decrease in diameter of the roller 28 as compared with the roller 27.

In turning the machine, the wheels at the outer side of the curve are enabled to travel faster than those at the inner side by reason of the fact that the shaft 23 is divided, and, therefore, a certain amount of slip may take place between one of the wheels 26 and the friction roller 27 or 28 in engagement therewith.

From the foregoing description, it will now be understood that the power is transmitted from the motor shaft to all four wheels of the machine, the steering wheels being driven as well as the rear driving wheels. It will also be understood that the sections of the front axle are driven in a direction the reverse of that in which the rear axle sections are driven, whether the machine is moving in a forward or backward direction. Furthermore, friction gearing is interposed between the motor and the worm shafts, so that both of said shafts are simultaneously driven normally at the same speed, but permitted to turn periodically at different relative speeds, in accordance with the radius of the arc described by the machine in making a turn. When the transmission frame is shifted to a central or neutral point, in which both of the friction drive rollers 27 and 28 are out of contact with the friction wheels 26, the transmission gearing is locked, by reason of the fact that the worm gear wheels 12 and 13 cannot turn the worm gears 15 and 16, the result being that the sections of the front and rear axles are all locked. This imparts the utmost safety to the machine in ascending or descending steep grades, for the reason that it is impossible for the machine to coast, either in a forward or backward direction. At the same time, it may be easily driven forwardly or backwardly by throwing one or the other of the friction drive rollers 27 and 28 into frictional driving engagement with the wheels 26.

While I have hereinabove made reference to worm gears and worm wheels, it is to be understood that spiral gears and wheels may be substituted therefor, the efficiency of both types of gears being equal in respect to the locking of the axle sections, when the transmission gear is thrown out of commission.

What is claimed is:

1. In four-wheel transmission for motor trucks, a truck frame, front and rear axles each divided into two sections, steering wheels geared to and driven by the front axle sections, driving wheels fast on the rear driving axle sections, a worm gear wheel fast on each section of the front and rear axles, the gear wheels on the front axle operating in a direction the reverse of those on the rear axle, substantially parallel worm shafts, right and left hand worm gears on each shaft driving the worm wheels on the respective front and rear axle sections, and a motor geared to both of said shafts.

2. In four wheel transmission for motor trucks, a truck frame, front and rear axles each divided into two sections, steering wheels geared to and driven by the front axle sections, driving wheels fast on the rear driving axle sections, a worm gear wheel fast on each section of the front and rear axles, the gear wheels on the front axle operating in a direction the reverse of those on the rear axle, substantially parallel worm shafts, right and left hand worm gears on each shaft driving the worm wheels on the respective front and rear axle sections, a motor, and friction driving mechanism interposed between the motor and said shafts.

3. In four wheel transmission for motor trucks, a truck frame, front and rear axles each divided into two sections, steering wheels geared to and driven by the front axle sections, driving wheels fast on the rear driving axle sections, a worm gear wheel fast on each section of the front and rear axles, the gear wheels on the front axle operating in a direction the reverse of those on the rear axle, substantially parallel worm shafts, right and left hand worm gears on each shaft driving the worm wheels on the respective front and rear axle sections, a motor, and friction driving and reversing mechanism interposed between the motor and said shafts.

In testimony whereof I affix my signature in presence of two witnesses.

FRANCIS M. PRETTYMAN.

Witnesses:
ERICK WALLIN,
AUG. A. SCHNEIDER.